(12) United States Patent
Ahn

(10) Patent No.: US 10,930,279 B2
(45) Date of Patent: Feb. 23, 2021

(54) VOICE FREQUENCY ANALYSIS SYSTEM, VOICE FREQUENCY ANALYSIS METHOD, AND VOICE RECOGNITION SYSTEM AND VOICE RECOGNITION METHOD USING THE SAME

(71) Applicant: The Industry & Academic Cooperation in Chungnam National University (IAC), Daejeon (KR)

(72) Inventor: Kang Hun Ahn, Daejeon (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 194 days.

(21) Appl. No.: 16/089,023

(22) PCT Filed: Apr. 13, 2017

(86) PCT No.: PCT/KR2017/004021
§ 371 (c)(1),
(2) Date: Sep. 27, 2018

(87) PCT Pub. No.: WO2017/183857
PCT Pub. Date: Oct. 26, 2017

(65) Prior Publication Data
US 2019/0130909 A1    May 2, 2019

(30) Foreign Application Priority Data

Apr. 18, 2016  (KR) .................. 10-2016-0047085
Jul. 25, 2016  (KR) .................. 10-2016-0094221

(51) Int. Cl.
*G10L 15/22*    (2006.01)
*G10L 15/24*    (2013.01)
(Continued)

(52) U.S. Cl.
CPC .............. *G10L 15/22* (2013.01); *G06K 9/00* (2013.01); *G06N 20/00* (2019.01); *G10L 15/24* (2013.01);
(Continued)

(58) Field of Classification Search
CPC ......... G10L 15/24; G10L 21/10; G10L 25/18; G06N 20/00; G06N 3/0481; G06N 3/084; G06K 9/00
(Continued)

(56) References Cited

U.S. PATENT DOCUMENTS 6,009,396 A       12/1999  Nagata
2004/0107172 A1*  6/2004   Wang .................. G06N 3/063
                                                         706/40
(Continued)

FOREIGN PATENT DOCUMENTS

KR    10-1996-0011843    4/1996
KR    10-2005-0120696    12/2005
(Continued)

OTHER PUBLICATIONS

KIPO, Search Report & Written Opinion of Application No. PCT/KR2017/004021, dated Jun. 29, 2017.
(Continued)

*Primary Examiner* — Richemond Dorvil
*Assistant Examiner* — Rodrigo A Chavez
(74) *Attorney, Agent, or Firm* — Lex IP Meister, PLLC

(57) ABSTRACT

The present invention relates to a system and method for recognizing a consonant and improving recognition performance within a short time, compared to prior art requiring a frequency decomposition process, by performing frequency analysis and voice recognition in real time without undergoing a frequency decomposition process of voice.

18 Claims, 16 Drawing Sheets

(51) Int. Cl.
- *G10L 25/18* (2013.01)
- *G10L 21/10* (2013.01)
- *G06K 9/00* (2006.01)
- *G06N 20/00* (2019.01)
- *G06N 3/04* (2006.01)
- *G06N 3/08* (2006.01)

(52) U.S. Cl.
CPC .............. *G10L 21/10* (2013.01); *G10L 25/18* (2013.01); *G06N 3/0481* (2013.01); *G06N 3/084* (2013.01)

(58) Field of Classification Search
USPC .......................................................... 704/232
See application file for complete search history.

(56) References Cited

U.S. PATENT DOCUMENTS

| | | | |
|---|---|---|---|
| 2009/0210220 A1 | 8/2009 | Mitsuyoshi et al. | |
| 2009/0271182 A1 | 10/2009 | Athineos et al. | |
| 2012/0070153 A1* | 3/2012 | Jonsson | F21V 33/0076 398/115 |
| 2017/0229117 A1* | 8/2017 | van der Made | G06F 3/167 |

FOREIGN PATENT DOCUMENTS

| | | |
|---|---|---|
| KR | 10-2006-0096684 | 9/2006 |
| KR | 10-2016-0030168 | 3/2016 |
| KR | 10-1689332 | 12/2016 |

OTHER PUBLICATIONS

Taegeun Song et al., "Physical Limits to Auditory Transduction of Hair-Cell Bundles probed by a Biomimetic System" Scientific Reports, , 5:114700, Jun. 2015.

Hyery Kim et al., "Sharply tuned small force measurement with a biomimetic sensor", Applied Physics Letters 98, 013704, 2011.

Woo Seok Lee et al., "Artificial Hair Cell Integrated with an Artificial Neuron: Interplay between Criticality and Excitability", Journal of the Korean Physical Society, vol. 65, No. 12, Dec. 2014, pp. 2147-2150.

Kang-Hun Ahn, "Enhanced signal-to-noise ratios in frog hearing can be achieved through amplitude death", Journal of the Royal Society Interface, 10:20130525, 2013.

Kyung-Joong Kim et al., "Amplitude death of coupled hair bundles with stochastic channel noise", Physical Review E 89, 042703, Apr. 2014.

Kang-Hun Ahn et al., "Quantum Friction of Micromechanical Resonators at Low Temperatures", Physical Review Letters, vol. 90, No. 8, Feb. 2003.

Kang-Hun Ahn et al., "Current Rectification by Spontaneous Symmetry Breaking in Coupled Nanomechanical Shuttles", Physical Review Letters PRL97, 216804, Nov. 2006.

G. E. Hinton et al., "Reducing the Dimensionality of Data with Neural Networks", Science vol. 313, pp. 504-507, Jul. 2006.

David E. Rumelhart et al., "Learning representations by back-propagating errors", Nature vol. 323, pp. 533-536, Oct. 1986.

Georg Von Bekesy, "Experiments in Hearing", Acoustical Society of America, 1960.

Robert D. White et al., "Microengineered hydromechanical cochlear model", Proc. Natl. Acad.Sci. vol. 102, pp. 1296-1301, Feb. 2005.

Hyun Soo Lee et al., "Flexible Inorganic Piezoelectric Acoustic Nanosensors for Biomimetic Artificial Hair Cells", Adv. Funct. Mater. 24, 6914-6921, 2014.

Hirofumi Shintakua et al., "Development of piezoelectric acoustic sensor with frequency selectivity for artificial cochlea", Sensors and Actuators A 158, 183-192, 2010.

James W. Cooley et al., "An Algorithm for the Machine Calculation of Complex Fourier Series", Mathematics of Computation, vol. 19, No. 90, pp. 297-301, Apr. 1965.

James W. Cooley, "Historical notes on the fast Fourier transform", IEEE, vol. 55, No. 10, 1675-1677 (1967).

Michael T. Heideman, "Gauss and the history of the fast Fourier transform", Archive for History of Exact Sciences vol. 34, No. 3, 265-277, 1985.

Charles Van Loan, "Computational Frameworks for the Fast Fourier Transform", SIAM, Philadelphia, 1992.

Adelbert W. Bronkhorst, "The Cocktail Party Phenomenon: a Review of Research on Speech Intelligibility in Multiple-Talker Conditions", Acustica Acta Acustica, vol. 86, 117-128, 2000.

Brian C. J. Moore, "Cochlear Hearing Loss", John Wiley & Sons, Ltd, England, 1-332, 2007.

\* cited by examiner (A)

(B)

Relative Position

VOICE FREQUENCY ANALYSIS SYSTEM, VOICE FREQUENCY ANALYSIS METHOD, AND VOICE RECOGNITION SYSTEM AND VOICE RECOGNITION METHOD USING THE SAME

TECHNICAL FIELD

The present invention relates to a voice frequency analysis system, a voice frequency analysis method, and a voice recognition system and a voice recognition method using the same, and it particularly relates to a system and method for converting a voice signal received through an artificial basilar membrane into a visual signal, analyzing a frequency of voice by use of machine learning, and performing voice recognition.

BACKGROUND ART

Conventional methods for extracting characteristics for voice recognition include a linear prediction coding (LPC) method for extracting characteristics by using an LPC filter, and a mel-frequency cepstral coefficients (MFCC) method for extracting characteristics based on a fast Fourier transform (FFT). The MFCC is strong for noise and has excellent recognition performance in comparison to the LPC in consideration of the feature of a human eye so it is widely used, but it takes a lot of time to store the voice signal received through a microphone and perform a FFT and a MFCC.

The voice forms a unit of sound by combining a consonant and a vowel, and hence, in order to extract the consonant and the vowel from the voice recognition, a Fourier transform for converting the voice signal in a time domain into a frequency domain must be performed. In this instance, when a signal processing delay time is equal to or greater than 10 ms during signal processing, a user may sense the time delay, so in order to prevent the time delay, a frame of about 10 ms is used in most Fourier transforms. Accordingly, the vowel with a pronunciation time of about 150 ms may be recognized by using more than ten frames, but a consonant with a pronunciation time of about 17 ms is recognized by using two frames, so the consonant has a lower recognition rate than the vowel. Further, the consonant may have low recognition accuracy in that its frequency component is irregular and its amplitude is small compared to the vowel and it may be easily distorted by external noise, so the recognition accuracy may be low.

The conventional voice recognition system analyzes a recognized voice to extract a consonant candidate group, and selects one consonant that is appropriate for a sentence after hearing the sentence, but it selects a consonant that is appropriate for the sentence and recognizes the sentence after hearing the sentence, so it is difficult to perform real-time voice recognition, and the recognition accuracy is low.

DISCLOSURE

Technical Problem

The present invention has been made in an effort to provide a system and method for performing a frequency analysis of voice and voice recognition in real time, and reducing time and power consumption used for the frequency analysis of voice and the voice recognition.

Technical Solution

The present invention has been made in another effort to provide a system and method for receiving a voice signal through an artificial basilar membrane and converting the received voice signal into a visual signal to analyze a frequency of voice.

The present invention has been made in another effort to provide a system and method for receiving a voice signal through an artificial basilar membrane to generate an image pattern and analyzing the generated image pattern to perform voice recognition.

The present invention has been made in another effort to provide a system and method for analyzing an image pattern corresponding to a movement of an artificial basilar membrane through a machine learning to identify a frequency and perform voice recognition.

Exemplary embodiments according to the present invention may be used to realize other tasks that are not mentioned in detail, in addition to the above-noted tasks.

An exemplary embodiment of the present invention provides a voice frequency analysis system including: a voice signal receiver for receiving a voice signal and generating a traveling wave corresponding to the received voice signal; an light emitter for irradiating light to the voice signal receiver; an image generator for generating an image pattern by measuring light transmitted through the voice signal receiver based on the light irradiated through the light emitter; and a frequency analyzer for analyzing the generated image pattern by using machine learning.

Another embodiment of the present invention provides a voice recognition system including: a voice signal receiver for receiving a voice signal and generating a traveling wave corresponding to the received voice signal; an light emitter for irradiating light to the voice signal receiver; an image generator for generating an image pattern by measuring light transmitted through the voice signal receiver based on the light irradiated through the light emitter; and a voice recognizer for performing voice recognition based on the image pattern.

Another embodiment of the present invention provides a voice frequency analysis method including: receiving an external voice signal through a voice signal receiver, and generating a traveling wave corresponding to the received voice signal; irradiating light to the voice signal receiver through an light emitter; generating an image pattern by measuring light transmitted through the voice signal receiver by the irradiated light through an image generator; and identifying a frequency of the received voice signal by analyzing the generated image pattern through a frequency analyzer.

Another embodiment of the present invention provides a voice recognition method including: receiving an external voice signal through a voice signal receiver, and generating a traveling wave corresponding to the received voice signal; irradiating light to the voice signal receiver through an light emitter; generating an image pattern by measuring light transmitted through the voice signal receiver by the irradiated light through an image generator; and performing voice recognition by analyzing the image pattern through a voice recognizer.

Advantageous Effects

According to one of exemplary embodiments of the present invention, the frequency analysis of voice and the voice recognition may be performed in real time.

Further, the time and power consumption used for the frequency analysis of voice and the voice recognition may be reduced.

MODE FOR INVENTION

Figure 1:
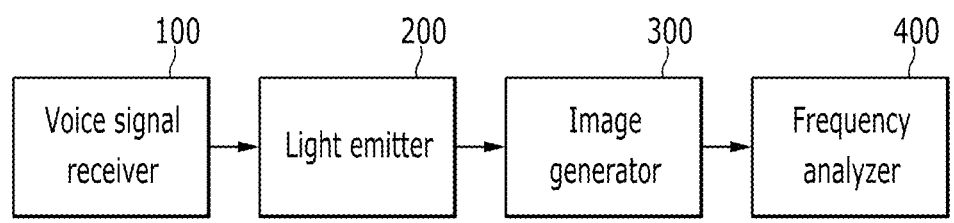
FIG. 1 shows a configuration of a voice frequency analysis system according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification. Further, prior art will not be described.

Unless explicitly described to the contrary, the word "comprise" and variations such as "comprises" or "comprising" will be understood to imply the inclusion of stated elements but not the exclusion of any other elements. The suffixes "-er" and "-or" and the term "module" described in the specification mean units for processing at least one function or operation, and can be implemented by hardware or software and combinations thereof.

In the present specification, a "frequency resolution" signifies performance of determining a change of frequency with respect to time when a voice signal is stimulated, and a "voice signal" signifies a human voice including a plurality of frequencies.

FIG. 1 shows a configuration of a voice frequency analysis system according to an exemplary embodiment of the present invention.

The voice frequency analysis system of FIG. 1 includes a voice signal receiver 100, an light emitter 200, an image generator 300, and a frequency analyzer 400.

The voice signal receiver 100 according to an exemplary embodiment of the present invention receives a voice signal from the outside. The voice signal receiver 100 is realized with a Fabry-Perot interferometer including an artificial basilar membrane. Here, the artificial basilar membrane imitates a basilar membrane inside a human cochlea, and generates vibration at different positions based on a frequency of the received voice signal.

A voice signal receiver will now be described in detail with reference to FIG. 2 and FIG. 3.

Figure 2:
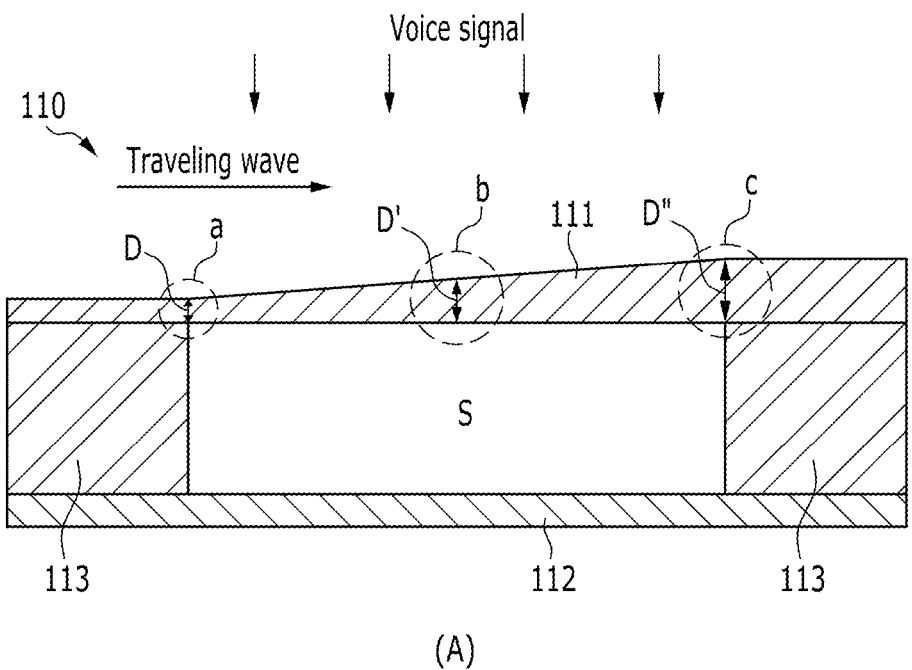
FIG. 2 shows a configuration of a voice signal receiver according to an exemplary embodiment of the present invention.
Figure 2:
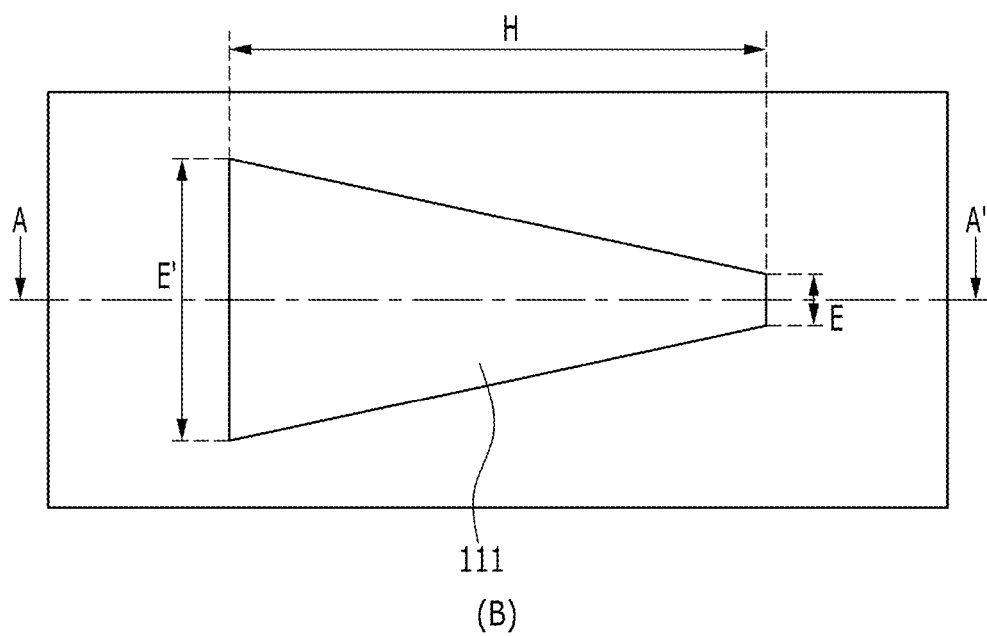

FIG. 2 shows a configuration of a voice signal receiver according to an exemplary embodiment of the present invention.

In FIG. 2, (A) is a lateral view of the voice signal receiver, and (B) is a top plan view of the voice signal receiver.

Referring to FIG. 2(A), the voice signal receiver 110 includes a first layer 111 for receiving a voice signal and generating vibration based upon the voice signal, a second layer 112 for transmitting light corresponding to the vibration generated by the first layer 111, and a supporter 113 provided between the first layer 111 and the second layer 112 and supporting the first layer 111.

The first layer 111 is realized with a basilar membrane with stiffness corresponding to the received voice signal, and includes a photosensitive polymer. In this instance, stiffness of the basilar membrane is determined by a mass or a length. Accordingly, the basilar membrane may be realized with various thicknesses (D, D', D") (mass) as shown in (A), it may be realized with different lengths of an upper side (E) and a lower side (E') as shown in (B), or it may be realized to have forms including various masses and lengths. For example, the basilar membrane may have a trapezoid shape in which the upper side (E) is greater than the lower side (E') as shown in (B).

The second layer 112 is realized to include a transparent material and have a constant thickness. For example, it may include one of glass, polyethylene, polycarbonate, and methacrylic resin.

The supporter 113 supports respective ends of the first layer 111 and the second layer 112 and includes an internal space (S) formed by the first layer 111 and the second layer 112. Here, the supporter 113 may include silicon.

Figure 3:
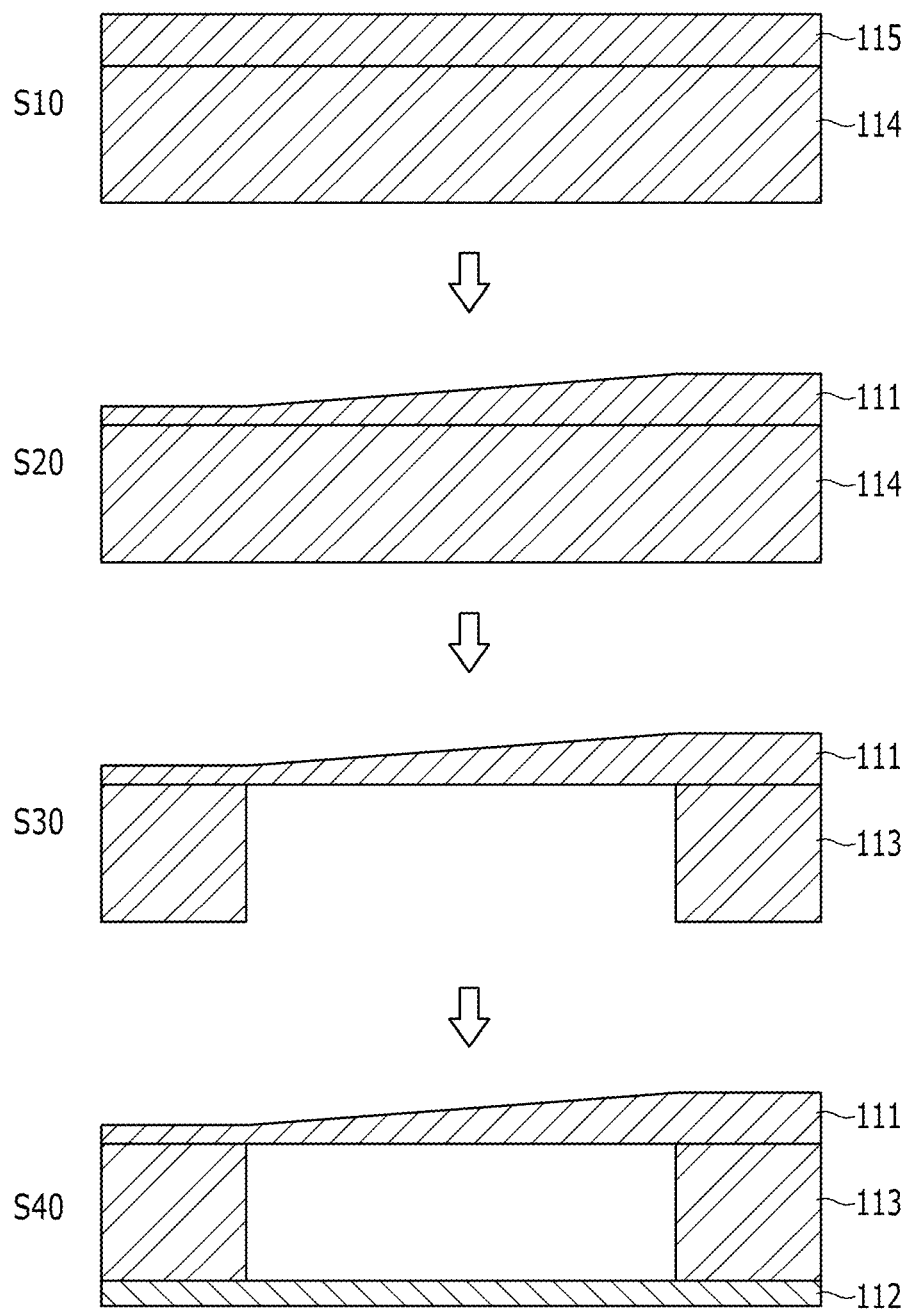
FIG. 3 shows a method for manufacturing a voice signal receiver of FIG. 2.

FIG. 3 shows a method for manufacturing a voice signal receiver of FIG. 2.

A photosensitive polymer 115 is coated on a silicon wafer 114 (S10), and a first layer 111 having various thicknesses is formed through gray-scale photolithography (S20). A supporter 113 is formed according to deep reactive ion etching (S30). Glass is bonded to a lower portion of the supporter 113 formed in the S30 to form a second layer 112 (S40).

Referring to FIG. 1, the light emitter 200 provides light for measuring vibration generated by the first layer 111 of the voice signal receiver 100. The light emitter 200 may be realized with one of a light emitting diode (LED), a laser diode (LD), and a semiconductor laser.

The image generator 300 generates an image pattern corresponding to the vibration generated by the first layer 111 by using the light provided by the light emitter 200. The image generator 300 may be realized with a complementary metal-oxide semiconductor (CMOS) image sensor or a charge-coupled device (CCD) image sensor.

Figure 4:
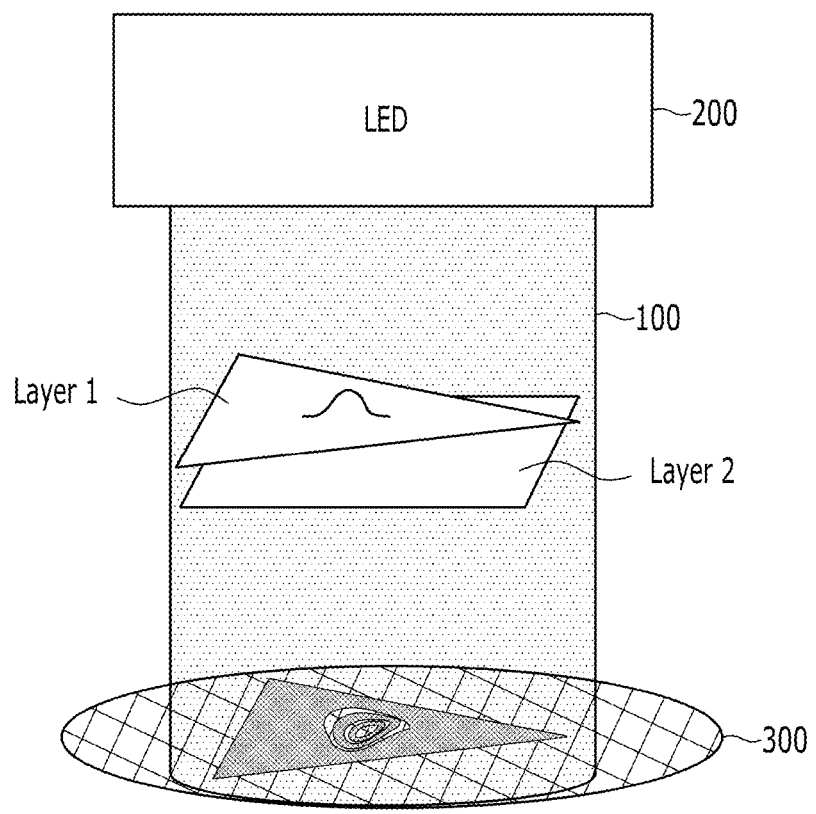
FIG. 4 shows a voice signal receiver, an light emitter, and an image generator according to an exemplary embodiment of the present invention.

FIG. 4 shows a voice signal receiver, an light emitter, and an image generator according to an exemplary embodiment of the present invention.

Referring to FIG. 4, when the voice signal receiver 100 receives a voice signal, light is irradiated to the first layer 111 having generated vibration through the light emitter 200, and light transmitted through the second layer 112 is received through the image generator 300 to generate an image pattern. The light emitter 200 may be realized with a low-power LED, and the image generator 300 may be realized with a low-power CMOS image sensor.

Referring to FIG. 4, the vibration generated by the first layer 111 is a traveling wave that proceeds in a vertical direction to the first layer 111, and the traveling wave has better frequency resolution than a standing wave in that the traveling wave does not substantially generate resonance. Further, a conventional voice signal sensing device for imitating a basilar membrane of a cochlea uses a fluid so as to transmit a voice signal stimulus applied to a configuration corresponding to a stapes to the entire basilar membrane region, but the voice signal receiver according to an exemplary embodiment of the present invention realizes the basilar membrane (first layer) to have various consecutive thicknesses and directly applies a voice signal stimulus to the basilar membrane to thus generate a traveling wave without a fluid, optically measure the same, and resultantly improve sensitivity and reduce power consumption.

A characteristic of the traveling wave generated by the voice signal receiver will now be described with reference to FIG. 5 to FIG. 7. Traveling wave energy will be given as Equation 1.

$$m_i \ddot{u}_i = \frac{k_i'}{2a^2}(u_{i+1} - u_i)^3 - \frac{k_{i-1}'}{2a^2}(u_i - u_{i-1})^3 - k_i u_i - m_i \gamma \dot{u}_i + f(t)$$ (Equation 1)

Here, $m_i$ is a mass, $u_i$ is a vertical displacement, $k_i'$ is an inter-mass coupling stiffness, $k_i$ is local stiffness, and $\gamma$ is a dissipation constant of an i-th finite element of the basilar membrane (first layer).

Figure 5:
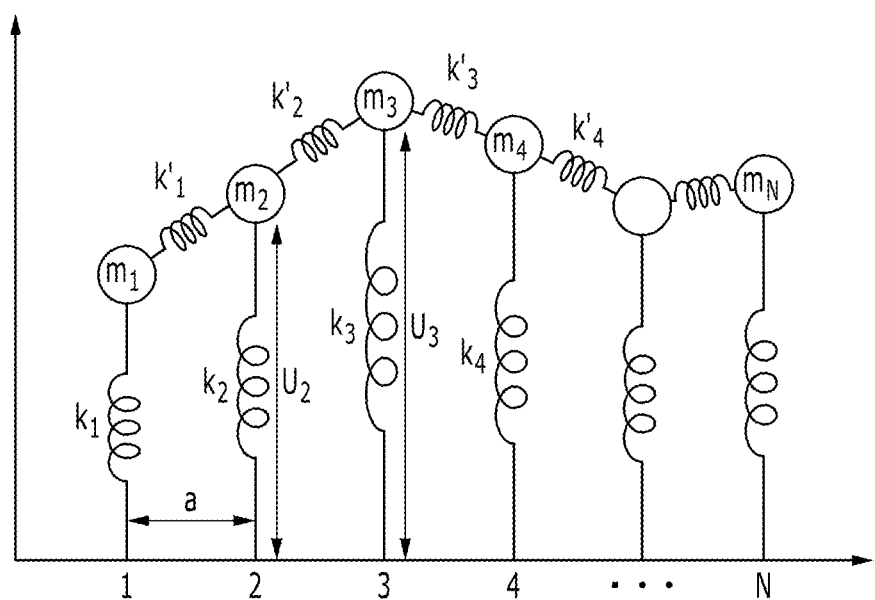
FIG. 5 shows a model for indicating a relationship between slope stiffness and vibration of a voice signal receiver according to an exemplary embodiment of the present invention.
Figure 6:
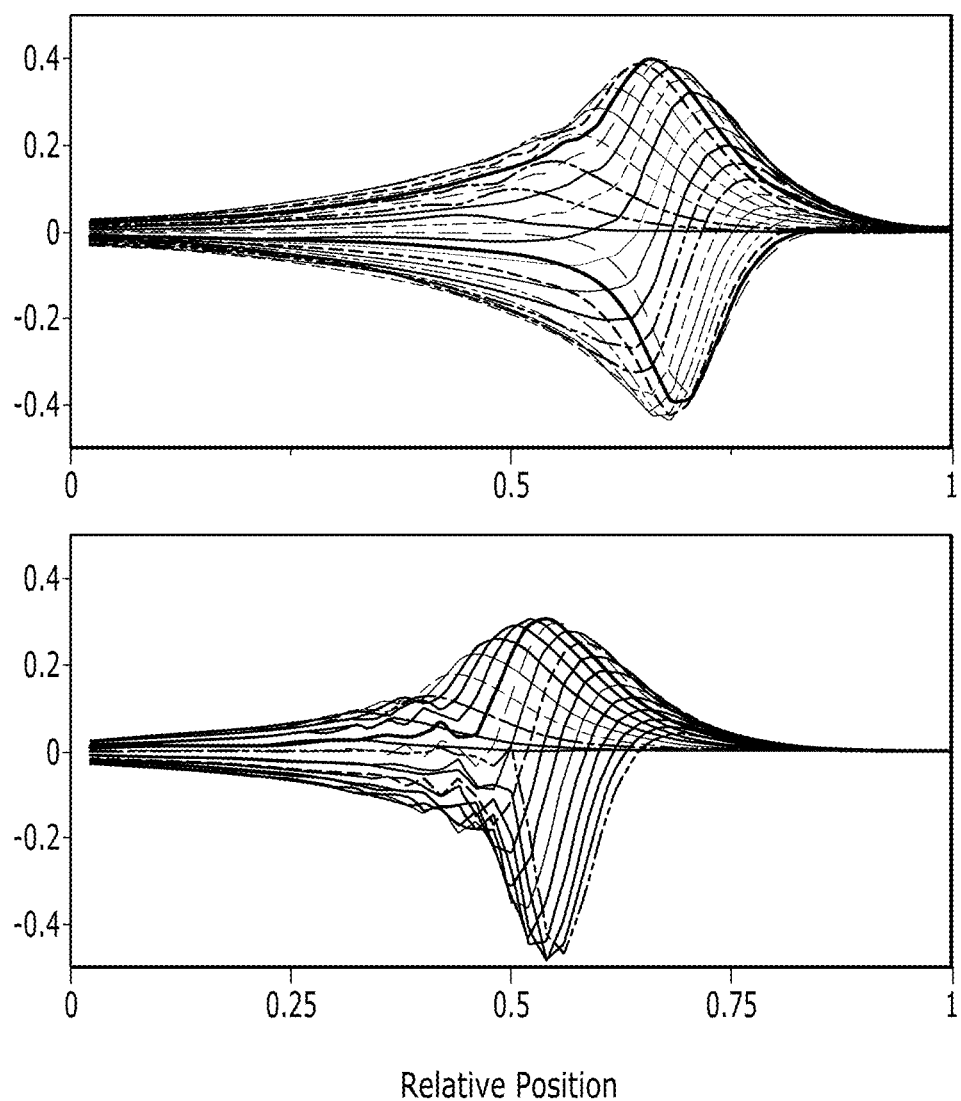
FIG. 6 shows a peak point and a wavelength envelope generated for one vibration cycle time.

FIG. 5 shows a model for indicating a relationship between slope stiffness and vibration of a voice signal receiver according to an exemplary embodiment of the present invention, and FIG. 6 shows a peak point and a wavelength envelope generated for one vibration cycle time.

Referring to FIG. 5, it is found that when the same stimulus f(t) is applied to each position as the fluid exists in the cochlea, stiffness is reduced while the mass increases to the right from the left. Accordingly, as shown in FIG. 6, it is found that as the frequency traveling wave becomes higher, the peak position of the frequency traveling wave is provided on the left.

In the case of spectrum analysis in a frequency window (standard wavelength) of $f_a < f < f_b$, a minimum time ($T_{membrane}$) needed for generating a traveling wave to the basilar membrane is given in Equation 2.

$$T_{membrane} = \frac{1}{f_a}$$ (Equation 2)

This shows that the required time ($T_{membrane}$) is not dependent on a frequency resolution.

On the contrary, regarding the conventional microphone analysis including a numerical analysis Fourier transform, data are received for a given time, and a data receiving time is calculated by an inverse of a frequency resolution ($\delta f$) as shown in Equation 3. By this, the minimum time ($T_{microphone}$) is determined by the frequency resolution ($\delta f$).

$$T_{microphone} = \frac{1}{\delta f}$$ (Equation 3)

Therefore, when the lowest frequency domain ($f_a$) is greater than the frequency resolution ($\delta f$), the time ($T_{membrane}$) used to the Fourier analysis using a basilar membrane is shorter than the time ($T_{microphone}$) used to the Fourier analysis using a microphone.

Figure 7:
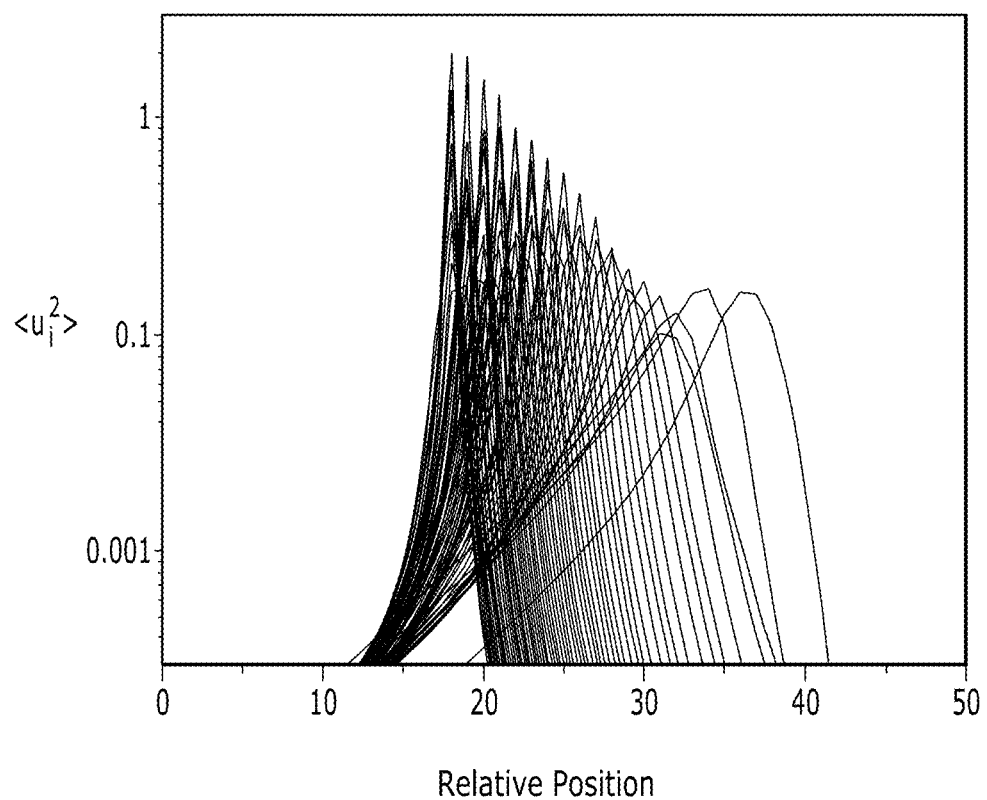
FIG. 7 shows a position-dependent variance of a basilar membrane displacement according to an exemplary embodiment of the present invention.

FIG. 7 shows a position-dependent variance of a basilar membrane displacement according to an exemplary embodiment of the present invention.

FIG. 7 shows a result of calculating a square of an averaged displacement as shown in Equation 4 through an optical measurement.

$$<u_i^2> = \frac{1}{T_{mem}} \int_t^{t+T_{mem}} u_i^2 \, dt$$ (Equation 4)

It is found in FIG. 7 that the square values of the averaged displacement corresponding to seventy frequencies ($f_1$, $f_2$, $f_3$, ..., $f_{70}$) are different and show a peak configuration that is similar to that of a biological basilar membrane. In detail, the time ($T_{membrane}$) used for the Fourier analysis using a basilar membrane (first layer) according to an exemplary embodiment of the present invention is determined by a low frequency domain, so the time ($T_{membrane}$) is $1/f_{30}$ in FIG. 7, and the time ($T_{microphone}$) used for the Fourier analysis using a microphone becomes $1/f_1$ which is greater than $1/f_{30}$.

Therefore, consonant recognition performance and accuracy may be improved by reducing the signal processing time.

Figure 8:
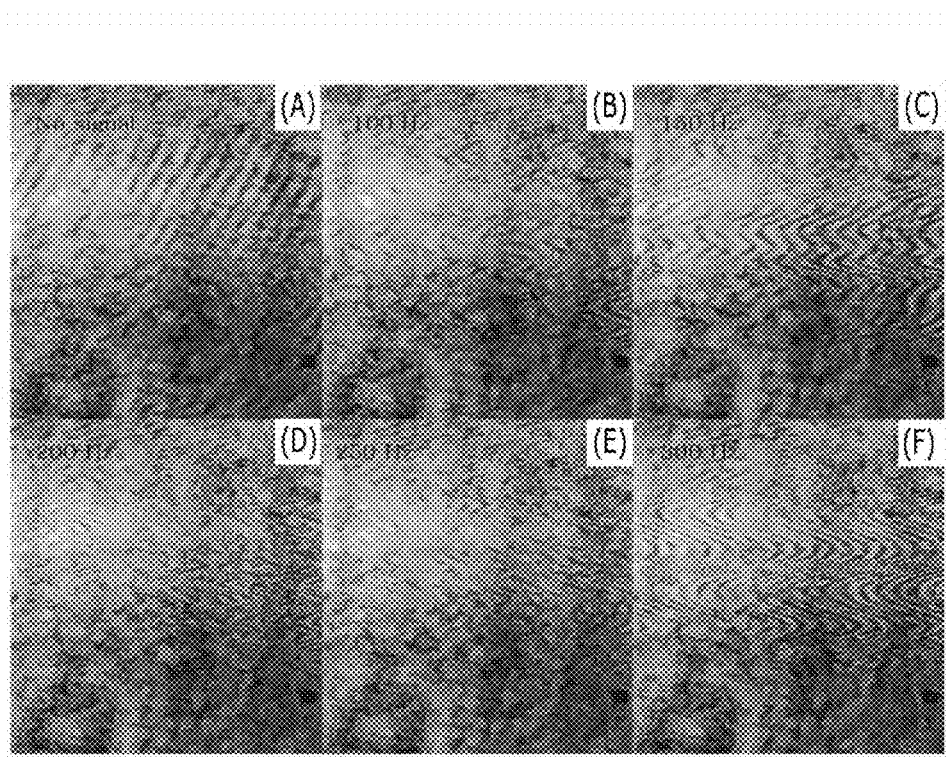
FIG. 8 shows an example of an image generated through an image generator of FIG. 4.

FIG. 8 shows an example of an image generated through an image generator of FIG. 4.

(A) of FIG. 8 shows an image generated through the image generator 300 when no voice signal is received, and (b), (c), (d), (e), and (f) show images generated through the image generator 300 when the voice signals with the frequencies of 100 Hz, 150 Hz, 200 Hz, 250 Hz, and 300 Hz are received.

Referring to FIG. 1, the frequency analyzer 400 analyzes the image pattern generated by the image generator 300 by use of machine learning. The frequency analyzer 400 may analyze the frequency of the voice signal received by the voice signal receiver 100 based on a feed-forward neural network.

A feed-forward-based artificial neural network learning method according to an exemplary embodiment of the present invention will now be described in detail.

Regarding the artificial neural network model, neurons calculate a sum of weight values of an input and connection intensity and output the same through an activation function, and the activation function ($a_j^l$) of the j-th neuron on the l-th layer is expressed in Equation 5. In this instance, the activation function is used to determine whether to activate the voice signal or deactivate the same when a voice signal stimulus is provided.

$$a_j^l = \sigma\left(\sum_k w_{jk}^l a_k^{l-1} + b_j^l\right) \quad \text{(Equation 5)}$$

Here, σ(x) is a sigmoid function, $w_{jk}^l$ is a weight value element for connecting the k-th neuron on the l-th layer and the j-th neuron of the l-th layer, and $b_j^l$ is a parameter control threshold value for the j-th neuron on the l-th layer.

A method for training (also referred to as classifying or optimizing) an artificial neural network minimizes an error, and the error is expressed in Equation 6.

$$C = \sum_x |y(x) - a^L(x)|^2 \quad \text{(Equation 6)}$$

Here, $y(x) = (y_1(x), y_2(x), \ldots)$ is a desired output for an input data set x, and L is an index of an output layer.

A steepest gradient method of Equation 7 is conventionally used to minimize the error C (here, η is a learning rate parameter), and according to an exemplary embodiment of the present invention, the error C is minimized through Equation 8 so as to solve the problem in which the process for minimizing the error function by using the steepest gradient method as the neural network includes many layers becomes complicated.

$$\begin{cases} w_{jk}^{l\prime} = w_{jk}^l - \eta \dfrac{\partial C}{\partial w_{jk}^l} \\ b_j^{l\prime} = b_j^l - \eta \dfrac{\partial C}{\partial b_j^l} \end{cases} \quad \text{(Equation 7)}$$

$$\begin{cases} \delta_j^L = \dfrac{\partial C}{\partial a_j^L} \sigma'(z_j^L) \\ \delta_j^l = \dfrac{\partial C}{\partial z_j^l} = \sum_k \delta_j^{l+1} w_{jk}^{l+1} \sigma'(z_j^l) \\ \dfrac{\partial C}{\partial b_j^l} = \delta_j^l \\ \dfrac{\partial C}{\partial w_{jk}^l} = a_k^{l-1} \delta_j^l \end{cases} \quad \text{(Equation 8)}$$

Here, $z_j^l$ is a back propagation method and is expressed in Equation 9.

$$z_j^l = \sum_k w_{jk}^l a_k^{l-1} + b_j^l \quad \text{(Equation 9)}$$

Input data of the neural network for classifying a response of a basilar membrane corresponding to various frequencies are local amplitudes generated by time averaging the basilar membrane. In this instance, the weight value element of the neural network and the threshold value may be acquired through training.

Figure 9:
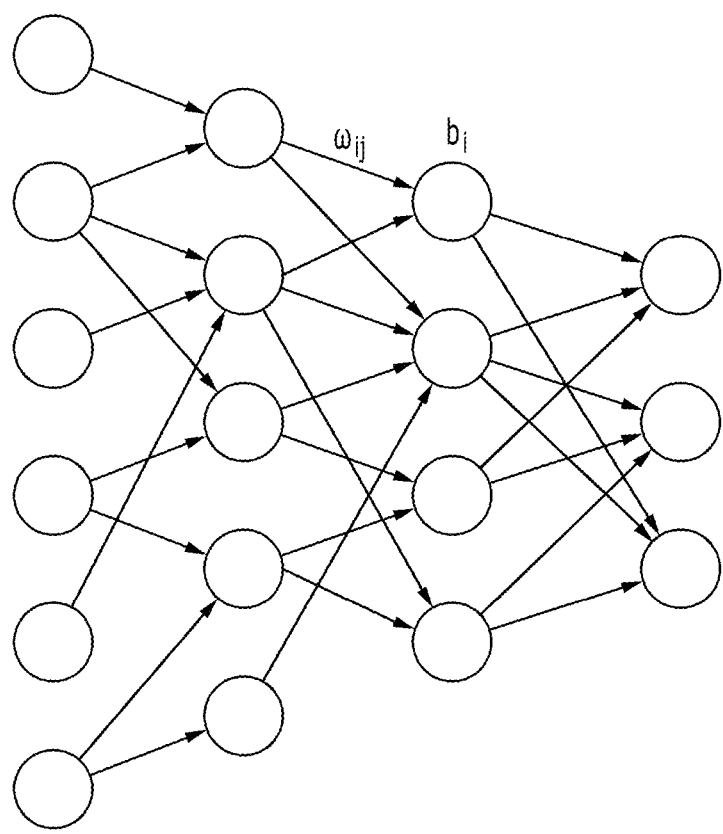
FIG. 9 shows a neural network.
Figure 10:
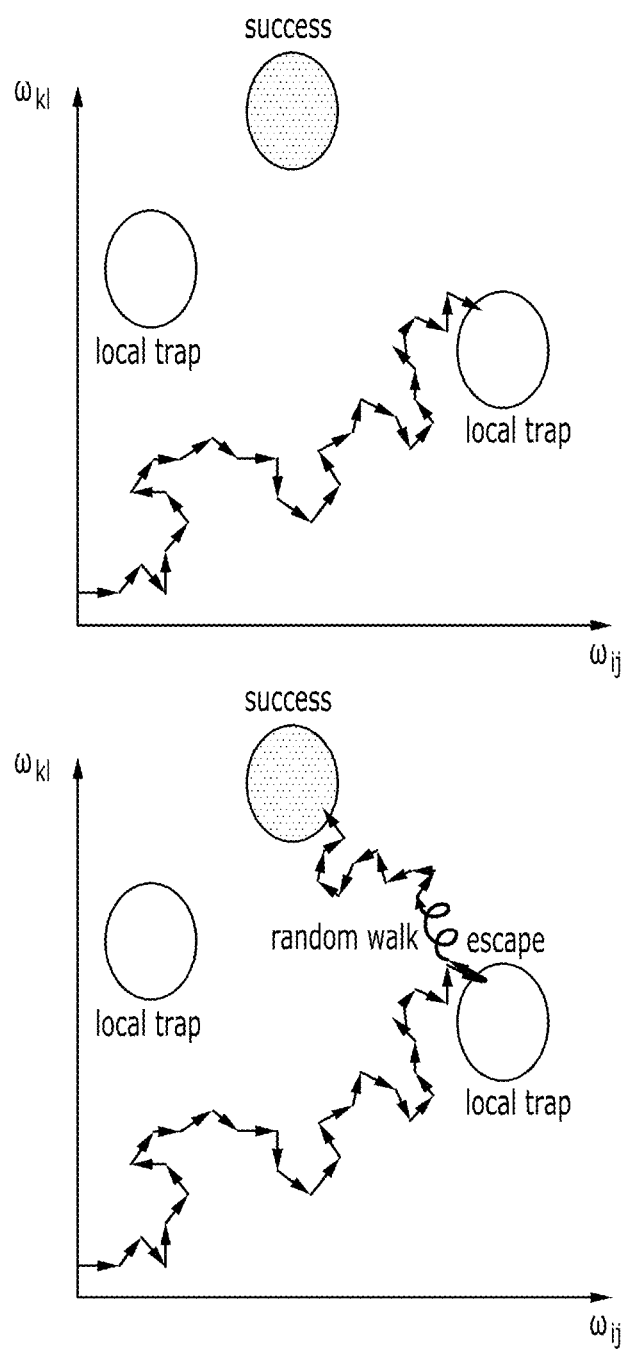
FIG. 10 shows a training method using a back propagation method according to an exemplary embodiment of the present invention.

FIG. 9 shows a neural network and FIG. 10 shows a training method using a back propagation method.

Referring to FIG. 10, in the case of reaching a local trap that is a wrong answer according to a training result, a precursor of the local trap is recognized, and it escapes by moving back by one step and randomly moves forward to thus perform error minimizing repetition.

Figure 11:
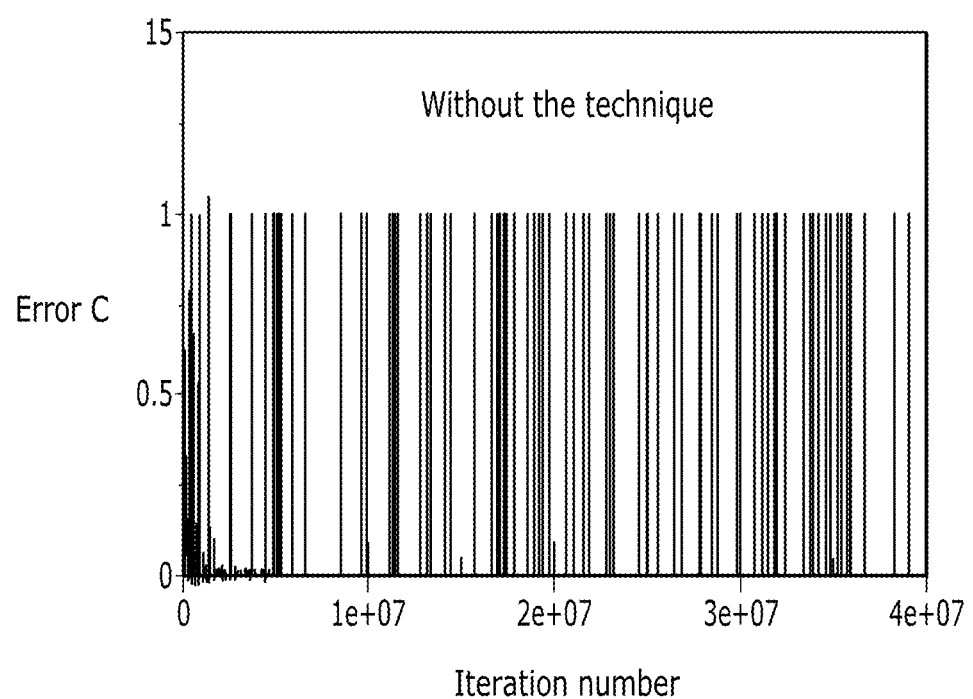
FIG. 11 shows a simulation result of an artificial neural network model using a conventional training method.
Figure 12:
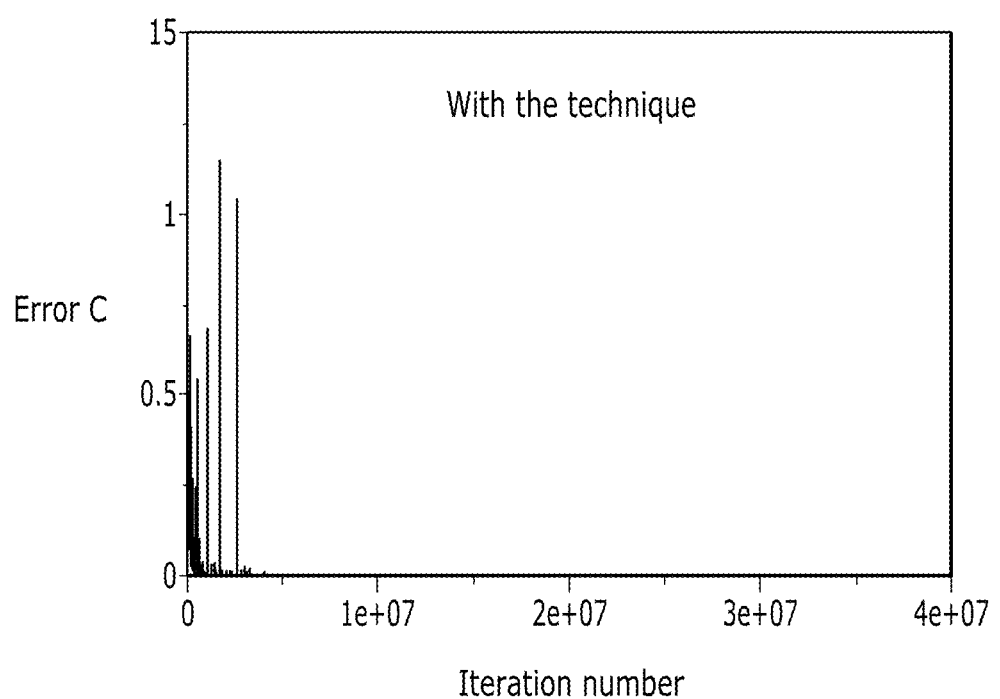
FIG. 12 shows a simulation result of an artificial neural network model using a training method according to an exemplary embodiment of the present invention.

FIG. 11 shows a simulation result of an artificial neural network model using a conventional training method, and FIG. 12 shows a simulation result of an artificial neural network model using a training method according to an exemplary embodiment of the present invention.

Referring to FIG. 11 and FIG. 12, the input data are positions (forty positions) of the time averaged amplitude of the basilar membrane corresponding to seventy different frequencies (FIG. 8).

FIG. 11 shows a result of minimizing errors through Equation 7, and checking that 100% minimization is not achieved through long-time training, and FIG. 12 shows a result of minimizing errors through Equations 8 and 9, and checking the result in which the error is minimized in a short time.

Accordingly, differing from the conventional Fourier transform method having the same number of data in a time domain and Fourier elements in a frequency domain, it is found according to an exemplary embodiment of the present invention that the responses of the basilar membranes corresponding to seventy different frequencies may be classified by using forty inputs. Therefore, the frequencies may be identified in a short time.

Figure 13:
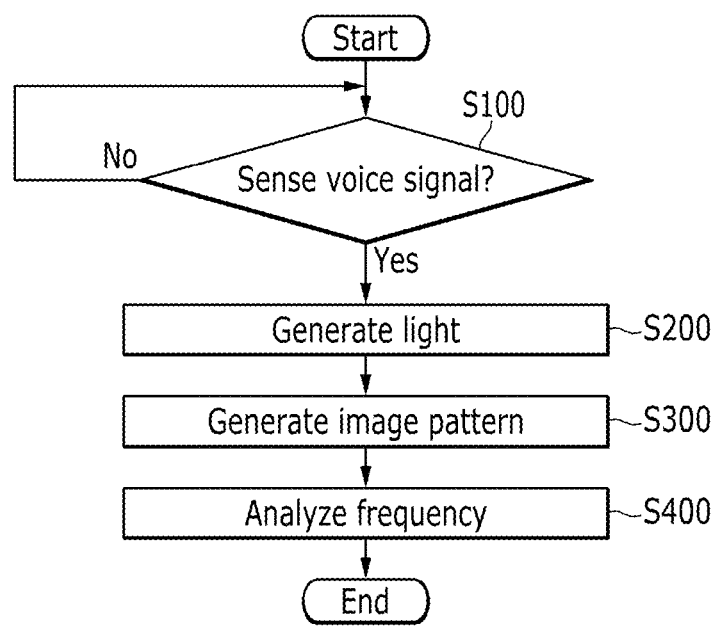
FIG. 13 shows a method for analyzing a voice frequency using a voice frequency analysis system of FIG. 1.

FIG. 13 shows a method for analyzing a voice frequency according to an exemplary embodiment of the present invention.

An external voice signal is received through the voice signal receiver 100, and it senses generation of a traveling wave of a basilar membrane (first layer) (S100).

When the traveling wave is sensed in step S100, light is irradiated to the voice signal receiver 100 through the light emitter 200 (S200).

An image pattern is generated by measuring the light transmitted from the voice signal receiver 100 through the image generator 300 (S300).

The frequency is identified by analyzing the image pattern generated in step S300 through the frequency analyzer 400 by using machine learning (S400).

Figure 14:
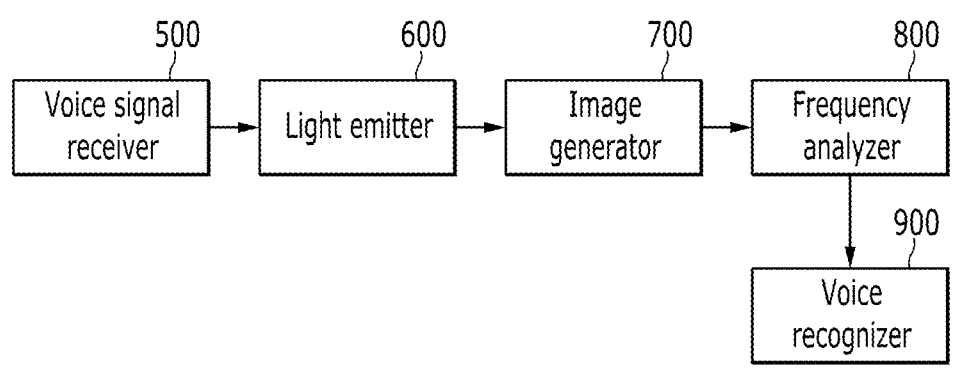
FIG. 14 shows a configuration of a voice recognition system according to an exemplary embodiment of the present invention.

FIG. 14 shows a configuration of a voice recognition system according to an exemplary embodiment of the present invention.

The voice recognition system of FIG. 14 includes a voice signal receiver 500, an light emitter 600, an image generator 700, a frequency analyzer 800, and a voice recognizer 900. Here, the voice signal receiver 500, the light emitter 600, the image generator 700, and the frequency analyzer 800 perform the same functions as the voice signal receiver 100, the light emitter 200, the image generator 300, and the frequency analyzer 400 of FIG. 1, so no repeated description will be provided.

The voice recognizer 900 of FIG. 14 analyzes the image pattern generated through the image generator 700 to perform voice recognition.

Figure 15:
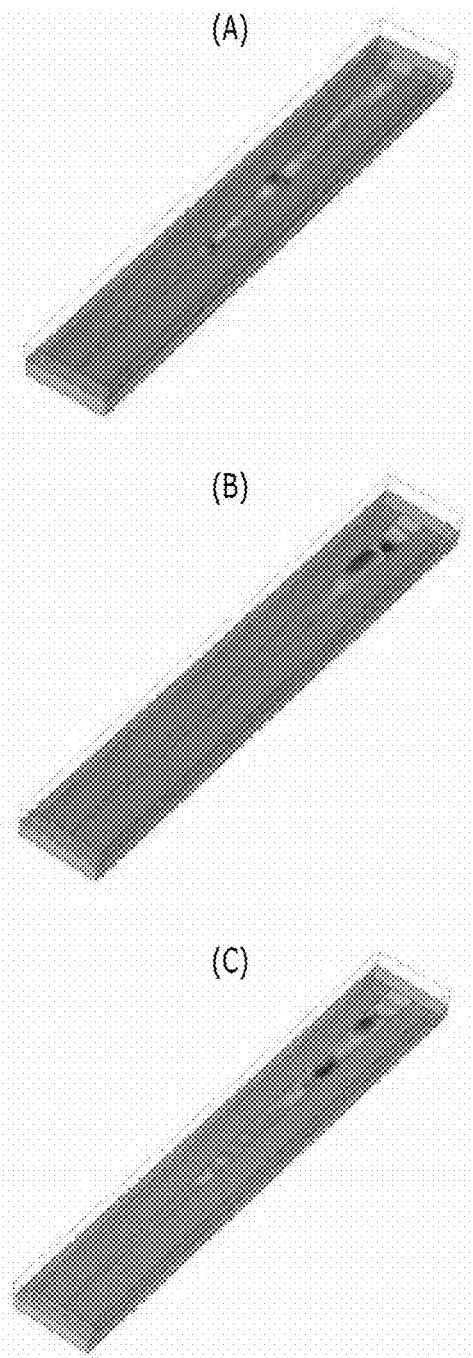
FIG. 15 shows a motion simulation result of a first layer according to an exemplary embodiment of the present invention.

FIG. 15 shows a motion simulation result of a first layer according to an exemplary embodiment of the present invention.

(A) of FIG. 15 is a result of simulating a movement of a first layer corresponding to a pressure on a signal of a consonant part of the voice signal '가', (B) is a result of simulating a movement of a first layer corresponding to a pressure on a signal of a consonant part of the voice signal '바', and (C) is a result of simulating a movement of a first layer corresponding to a pressure on a signal of a consonant part of the voice signal '다'.

Referring to FIG. 15, it is found that the movements of the first layers corresponding to the consonant signals of '가', '바', and '다' are different from each other, and the voice recognizer 900 may not undergo the frequency analysis process through this, and may analyze the image pattern corresponding to the movement of the first layer to recognize the consonant.

Referring to FIG. 14, the voice recognizer 900 according to an exemplary embodiment of the present invention performs voice recognition based on a frequency analysis result by the frequency analyzer 800. For example, characteristics may be extracted according to the frequency analysis result, and the extracted characteristics may be compared to a stored voice model database to output a voice recognition result.

Figure 16:
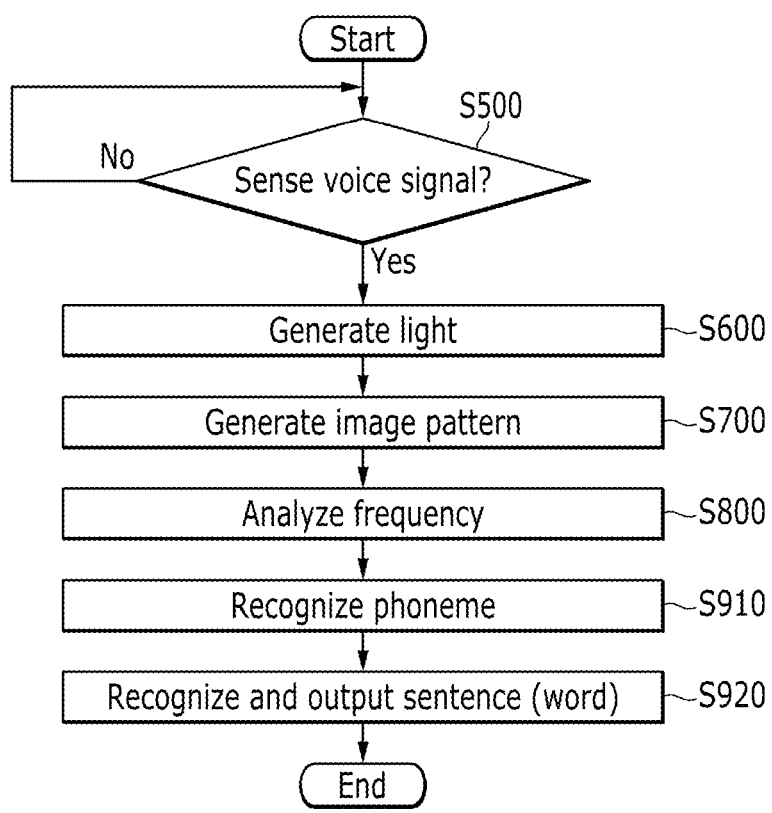
FIG. 16 shows a voice recognition method using a voice recognition system of FIG. 14.

FIG. 16 shows a voice recognition method using a voice recognition system of FIG. 14.

The steps S500 to S800 in the voice recognition method of FIG. 16 correspond to the steps S100 to S400 of FIG. 14, so no repeated descriptions will be provided.

Referring to FIG. 16, a phoneme is recognized based on the frequency analysis result of step S800 through the voice recognizer 900 (S910), and a word or a sentence corresponding to the voice signal received in step S500 is recognized based on a phoneme recognition result of step S910 and the recognized one is output (S920). Further, the image pattern generated in step S700 is analyzed to recognize the phoneme through the voice recognizer 900, and the word or the sentence may be recognized and output.

According to an exemplary embodiment of the present invention, the syllable recognition is allowable without undergoing the frequency decomposition process, so the consonant may be recognized within a short time compared to the prior art requiring a frequency decomposition process, so the consonant recognition performance may be improved.

The voice frequency analyzing method according to an exemplary embodiment of the present invention may be installed in a device, or it may be realized into a program directly installed by the user and may be recorded on a recording medium that is computer-readable. Here, the computer may include a desktop, a laptop, a smartphone, a tablet PC, a personal information terminal (PDA), and a mobile communication apparatus. Further, the recording medium may include a ROM, a RAM, a CD-ROM, a magnetic tape, a floppy disk, and an optical media storage device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A voice frequency analysis system comprising:
a voice signal receiver for receiving a voice signal and generating a traveling wave by generating vibration based on the received voice signal;
an light emitter for irradiating light to the voice signal receiver;
an image generator for generating an image pattern by measuring light corresponding to the vibration which is transmitted through the voice signal receiver; and
a frequency analyzer for analyzing the generated image pattern by using machine learning.

2. The voice frequency analysis system of claim 1, wherein
the voice signal receiver is a Fabry-Perot interferometer including a basilar membrane.

3. The voice frequency analysis system of claim 1, wherein
the voice signal receiver includes:
a first layer for generating the traveling wave in a second direction based on the voice signal received in a first direction;
a second layer disposed on a lower end of the first layer and transmitting light reflected from the first layer; and
a supporter disposed between the first layer and the second layer and forming an internal space for reflecting light irradiated through the light emitter.

4. The voice frequency analysis system of claim 3, wherein
the first direction is perpendicular to the second direction.

5. The voice frequency analysis system of claim 3, wherein
the first layer has stiffness corresponding to the traveling wave.

6. The voice frequency analysis system of claim 3, wherein
the first layer includes various thicknesses or lengths.

7. The voice frequency analysis system of claim 3, wherein
the second layer includes a transparent material and has a constant thickness.

8. The voice frequency analysis system of claim 1, wherein
the light emitter is a light emitting diode (LED), a laser diode (LD), or a semiconductor laser.

9. The voice frequency analysis system of claim 1, wherein
the image generator is a complementary metal-oxide semiconductor (CMOS) image sensor or a charge-coupled device (CCD) image sensor.

10. The voice frequency analysis system of claim 1, wherein
the frequency analyzer identifies a frequency of the received voice signal based on the image pattern through feedforward-based artificial neural network learning and back propagation learning.

11. A voice recognition system comprising:
a voice signal receiver for receiving a voice signal and generating a traveling wave by generating vibration based on the received voice signal;
an light emitter for irradiating light to the voice signal receiver;
an image generator for generating an image pattern by measuring light corresponding to the vibration which is transmitted through the voice signal receiver based on the light irradiated through the light emitter; and
a voice recognizer for performing voice recognition based on the image pattern.

12. The voice recognition system of claim 11, further comprising
a frequency analyzer for analyzing the image pattern using machine learning,
wherein the voice recognizer performs voice recognition based on the analysis result.

13. A voice frequency analysis method comprising:
receiving an external voice signal through a voice signal receiver, and generating a traveling wave by generating vibration based on the received voice signal;

irradiating light to the voice signal receiver through an light emitter;

generating an image pattern by measuring light corresponding to the vibration which is transmitted through the voice signal receiver by the irradiated light through an image generator; and identifying a frequency of the received voice signal by analyzing the generated image pattern through a frequency analyzer.

14. The voice frequency analysis method of claim 13, wherein the generating of a traveling wave includes receiving the voice signal in a first direction and generating the traveling wave in a second direction.

15. The voice frequency analysis method of claim 13, wherein the generating of an image pattern generates a per-frequency image pattern of the received voice signal.

16. The voice frequency analysis method of claim 13, wherein the identifying of a frequency includes identifying a frequency of the received voice signal through feed-forward-based artificial neural network learning and back propagation learning.

17. A voice recognition method comprising:

receiving an external voice signal through a voice signal receiver, and generating a traveling wave by generating vibration based on to the received voice signal;

irradiating light to the voice signal receiver through an light emitter;

generating an image pattern by measuring light corresponding to the vibration which is transmitted through the voice signal receiver by the irradiated light through an image generator; and performing voice recognition by analyzing the image pattern through a voice recognizer.

18. The voice recognition method of claim 17, further comprising identifying a frequency of the received voice signal by analyzing the image pattern through a frequency analyzer, wherein the performing of voice recognition includes performing voice recognition based on the frequency identifying result.

\* \* \* \* \*